United States Patent [19]
Hecker

[11] 3,807,507
[45] Apr. 30, 1974

[54] APPARATUS FOR PLOWING
[76] Inventor: Liberatus L. Hecker, 210 Garfield, Quinter, Kans. 67752
[22] Filed: Aug. 9, 1972
[21] Appl. No.: 279,012

[52] U.S. Cl............... 172/179, 172/175, 172/192, 172/196, 172/532
[51] Int. Cl................ A01b 5/00, A01b 49/02
[58] Field of Search............ 172/44, 175, 177, 179, 172/192, 193, 196, 382, 532, 699, 700, 720

[56] References Cited
UNITED STATES PATENTS

| 221,034 | 10/1879 | Crenshaw | 172/177 |
| 991,855 | 5/1911 | Kenworthy | 172/177 X |
| 1,371,706 | 3/1921 | Paloheimo | 172/177 |
| 1,546,086 | 7/1925 | Koller | 172/44 |
| 2,227,527 | 1/1941 | Wolfe | 172/44 |
| 2,398,385 | 4/1946 | Mintken | 172/44 X |
| 2,692,544 | 10/1954 | Jessup | 172/699 X |
| 2,725,006 | 11/1955 | Richmond | 172/44 |
| 3,246,703 | 4/1966 | Erdman | 172/44 |
| 3,310,011 | 3/1967 | Miller | 172/44 X |
| 3,714,992 | 2/1973 | Meier | 172/175 |

FOREIGN PATENTS OR APPLICATIONS

| 791 | 1855 | Great Britain | 172/699 |
| 467,095 | 8/1950 | Canada | 172/532 |

Primary Examiner—Robert E. Pulfrey
Assistant Examiner—Paul T. Sewell
Attorney, Agent, or Firm—Sheridan, Ross & Fields

[57] ABSTRACT

Improvements in apparatus for plowing beneath the surface of soil, such as with submerged V-shaped or sweep plow blades, wherein the soil behind such blades is further worked by submerged rotary helical members which work the soil in two rotary modes which are angularly related and follow the angular mode of working ahead thereof by the plow blades. The rotary members are so shaped that components of force are applied thereto as they follow the blades for rotating same and without application of a power drive thereto other than that supplied by a tractor pulling same.

5 Claims, 3 Drawing Figures

PATENTED APR 30 1974 3,807,507

APPARATUS FOR PLOWING

BACKGROUND OF THE INVENTION

In the tilling of soil, a well known technique employs moving a plurality of laterally spaced V-shaped plow members through the soil and beneath the surface thereof, this type of apparatus being known as stubble mulch plows or sweep plows. Exemplary of this type is that manufactured by Ideal Industries, Inc., Quenter, Kansas, known as the Flex-King. Another is that manufactured by the Kraus Plow Corporation, Hutchison, Kansas. As an accessary to the Flex-King plow, a trailing rotary spike tooth harrow is available which aids in killing weeds, this general tandem combination of implements, probably being the closest prior art to the present invention. The harrows, which are in the form of spiked wheels, roll along the surface of the ground and work the ground and weeds from the surface of the soil which, as will subsequently appear, is a different form of soil working and weed treatment than in the present invention.

SUMMARY OF THE INVENTION

The present invention is characterized by an accessary which may be employed with plows of the type referred to or furnished as a part thereof in the original apparatus as supplied by a manufacturer. As an aid to killing weeds, it differs from the Flex-King arrangement in that the working occurs below the surface of the soil in proximity to the weed roots. Also, the soil behind the V-shaped plows is worked in a different manner, but without pulverization, the latter usually being undesirable in tilling of the soil.

It is further characterized by a rotary member disposed just rearwardly of each plow member and parallel therewith so that the rotary members are also disposed in V-formation. Each is twisted about its longitudinal axis of rotation, in the form of a helix and so arranged that the apparatus effects their rotation without application of a separate power source, which is usually required in submerged rod weeders. The action of each rotary member is thus that of a rotatable helix bodily moving beneath the soil and rotating about an axis disposed angularly to its bodily direction of movement.

One of the principal objects, accordingly, is the provision of trailing ground working devices for angularly disposed pairs of sub-surface plows of the sweep or stubble mulch type which augments the working of the soil by the plows in the locus rearwardly thereof.

Another object is to provide such devices so that they may be retrofitted to existing equipment, as accessories, or supplied with original equipment as furnished by a manufacturer.

A further object is to so construct such devices that they are rotated by forward movement and without application of a separate power source.

Still further objects, advantages and salient features will become more apparent from the detailed description to follow, the appended claims, and the accompanying drawing, to now be briefly described.

DETAILED DESCRIPTION OF PREFERRED EMBODIMENTS

Figure 1:
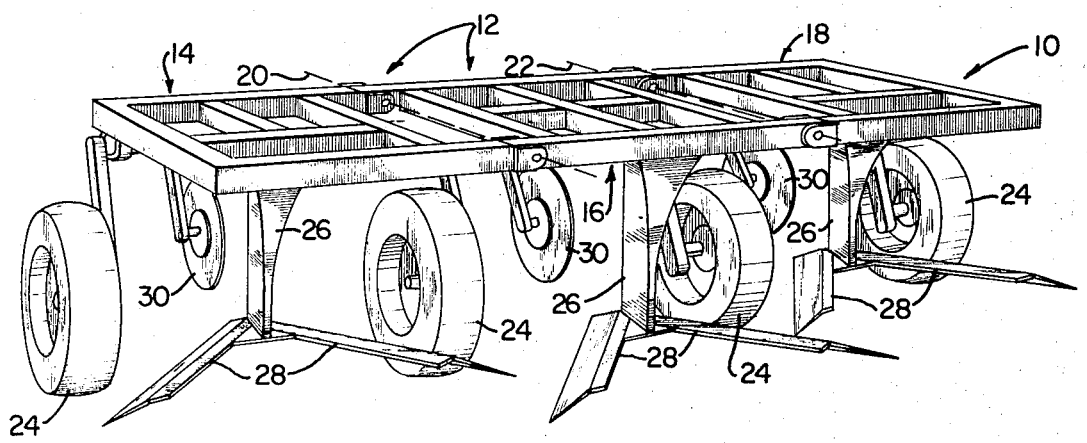
FIG. 1 is an isometric view of a conventional sweep plow of the type to which the subject of the invention may be attached as either an accessary or original equipment.

Referring now to the drawing, and first to FIG. 1, one form of conventional plow or tilling apparatus 10 comprises a frame 12, formed of sections 14, 16, 18 and pivotally connected together for relative movement about axes 20, 22 so that the section may articulate and follow terrain which is other than flat. Supporting wheels 24 are adjustably carried by the frame so that it may be disposed at desired positions above the ground. The entire apparatus is normally towed by a tractor (not shown) as understood in the art. A downwardly extending plow support or shank 26 is carried by each section to the lower end of which is rigidly affixed a V-shaped plow 28 which moves in a direction toward the apex of the V and along its central axis of symmetry. Coulter or Trash cutting disks 30 are disposed ahead of the apex of each plow, the construction so far described all being conventional in the art.

Figure 2:
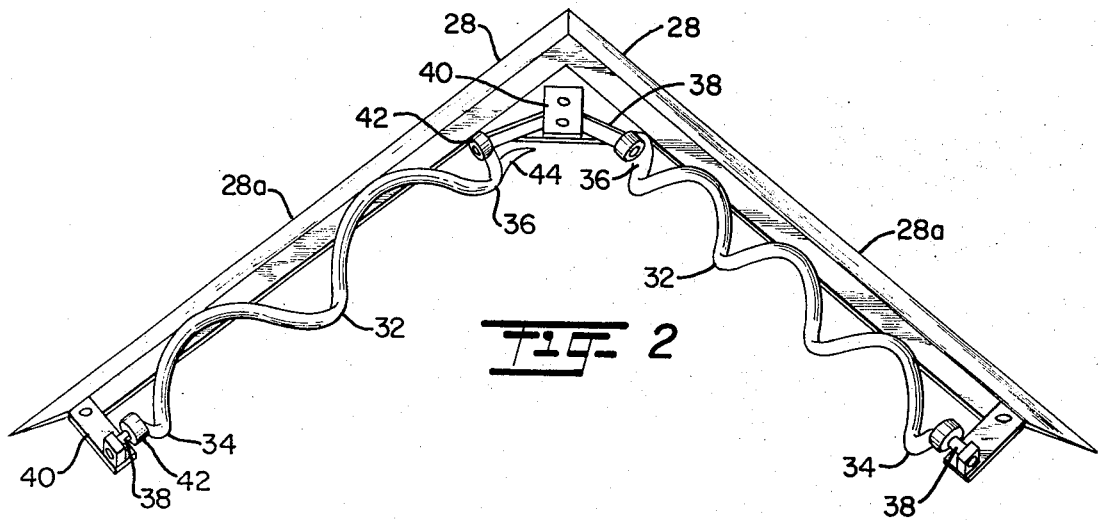
FIG. 2 is an elevation of one of the V-shaped plows of FIG. 1, with the subject of the invention attached, as viewed from the rear in the downwardly and forwardly direction.

FIG. 2 illustrates one of the V-shaped plows to which the subject of the invention has been affixed, this comprising a rotary member 32 disposed rearwardly of a pair of blades 28a, each of which moves through the earth at an angle to its direction of movement.

As illustrated, each member 32 comprises a rod which has been formed into a helix of substantially constant diameter and resembling a coil spring having widely spaced coils. Advantageously, one member has a reverse helix from the other member so that the members rotate in the opposite direction when pulled through the earth. Its ends may be bent inwardly toward its longitudinal axis to provide end cranks 34, 36 or may be welded to the outer ends of separate cranks. Each crank is supported by a fixed pintle 38 secured to a bracket 40 which is bolted or otherwise secured to a plow member 28a, the pintles each supporting a bearing 42 carried by the inner end of a crank 34 or 36. The forward or leading end 44 of each rod is preferably flattened and/or sharpened to aid in boring into the soil and moving through the soil as it rotates in its circular orbit around its associated pintle 38. The helix diameter of bar 32 and its axis of rotation are preferably chosen such that the lowermost portion of the periphery of rotation lies about one inch above the plane of the lower edges of plows 28a, so that they rotate within earth which has just been worked by the plows. Thus, weed nutriment is disrupted at an optimum position, which is at their roots, subjecting same to an optimum kill. In addition, the soil behind the plow blades is further loosened, but without pulverization, to enhance the growth of the desired crop. Further, the disruption of the weed roots occurs throughout the cylindrical envelope of the helix which is a considerably greater volume than with submerged rod weeders. Also, as distinguished from the spike tooth harrow, previously referred to, the disruption of the roots occurs below the undisturbed surface of the soil, rather than through such surface, thus differing in soil working from the conventional type submerged rod weeder or a soil surface type harrow.

Figure 3:
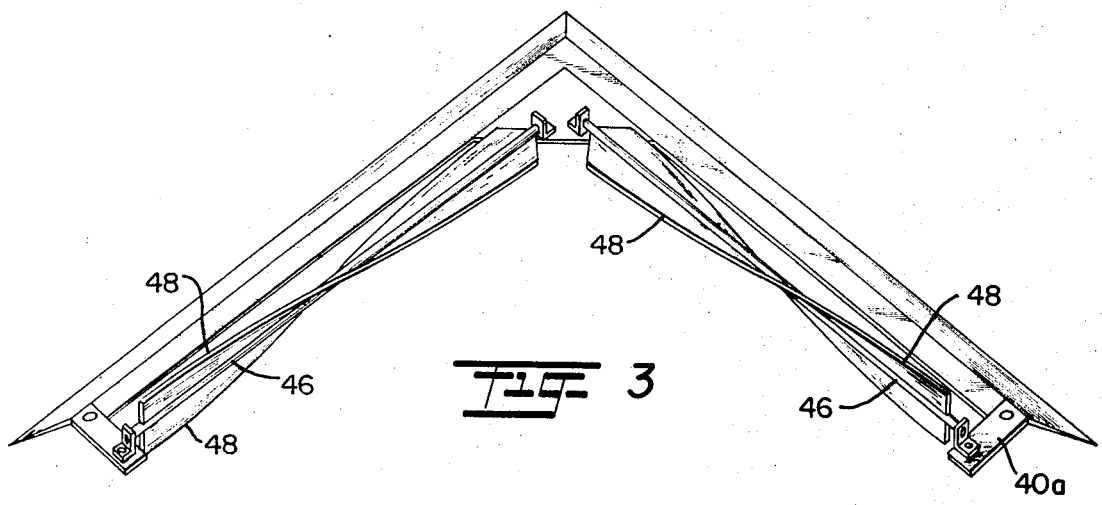
FIG. 3 is an alternative form of the invention of FIG. 2.

FIG. 3 illustrates another version of the invention in which a straight bar 46 is supported by bearings at its ends, as in FIG. 2, having helically twisted plates 48, 48 attached thereto, as by welding. Conveniently, the forward ends of the plates are beveled to aid its entry into the soil as the plow advances.

The invention has been described in considerable detail with reference to preferred embodiments thereof, but it will be understood that variations and modifications can be effected within the spirit and scope of the invention.

What is claimed is:

1. In soil undercutting apparatus including a pair of like elongated blades of substantially uniform cross section and of a length materially in excess of the width thereof and disposed in V formation, adapted to be moved entirely beneath the surface of the soil with the apex thereof disposed ahead of their trailing ends and with the plane of each blade tilted rearwardly at an obtuse angle to its forward direction of movement and with its longitudinal axis disposed at an obtuse angle to its forward direction of movement, to thereby provide a leading lower edge and a trailing upper edge, each blade adapted to lift a layer of soil disposed above its lower edge and redeposit same behind its upper trailing edge, each layer being in the form of a substantially standing wave with the crest thereof disposed approximately above its trailing edge, the improvement comprising:

an elongated rotary sub-soil working member mounted for rotation about an axis substantially parallel to each blade and in a position rearwardly of its trailing edge;

each member being of a length substantially coextensive with its associated blade and having a helical outer edge rotatable to define a reference cylindrical envelope, the envelope being disposed in the path of the soil as it moves, relatively, over the trailing edge of the blade and toward its position of redeposit behind the blade so that the soil is worked with rotary agitation just prior to being redeposited behind the rotary member and blade;

each rotary member being rotated by its forward and angular movement through the sub-soil, and means for mounting each rotary member to the undercutting apparatus for rotation about its axis of rotation.

2. Apparatus in accordance with claim 1 wherein the rotary members are accessory attachments for use with conventional undercutting apparatus with blades of the type described, and said mounting means comprises accessory bearings adapted to be affixed to the blades for rotatably supporting each rotary member at opposite ends thereof to opposite ends of a blade.

3. Apparatus in accordance with claim 1 wherein the direction of twist of the outer edges of the two rotary members is opposite so that they rotate in opposite directions so that the rotary direction of working the soil, before it is redeposited, is the same relative to each associated blade.

4. Apparatus in accordance with claim 1 wherein the rotary members, as viewed looking rearward from said apex, comprise a right and left member, the left member adapted to rotate clockwise and the right member adapted to rotate counterclockwise, whereby each rotary member effects rotary agitation in an upward direction in the locus between it and its associated blade.

5. In soil undercutting apparatus including an elongated blade of substantially uniform cross section and of a length materially in excess of the width thereof adapted to be moved entirely beneath the surface of the soil with the plane of the blade tilted rearwardly at an obtuse angle to its forward direction of movement and with its longitudinal axis disposed at an obtuse angle to its forward direction of movement, to thereby provide a leading lower edge and a trailing upper edge, the blade adapted to lift a layer of soil disposed above its lower edge and redeposit same behind its upper trailing edge, said layer being in the form of a substantially standing wave with the crest thereof disposed approximately above its trailing edge, the improvement comprising:

an elongated rotary subsoil working member mounted for rotation about an axis substantially parallel to said blade and in a position rearwardly of its trailing edge;

said member being of a length substantially coextensive with said blade and having a helical outer edge rotatable to describe a reference cylindrical envelope, the envelope being disposed in the path of the soil as it moves, relatively, over the trailing edge of the blade and toward its position of redeposit behind the blade, so that the soil is worked with rotary agitation just prior to being redeposited behind the rotary member and blade;

said rotary member being rotated by its forward and angular movement through the sub-soil, and means for mounting the rotary member to the undercutting apparatus for rotation about its axis of rotation.

* * * * *